(12) United States Patent
Asai et al.

(10) Patent No.: US 6,508,339 B2
(45) Date of Patent: Jan. 21, 2003

(54) DRUM BRAKE DEVICE HAVING A SHOE CLEARANCE OVER-ADJUSTMENT PREVENTION APPARATUS

(75) Inventors: Seiji Asai, Okazaki (JP); Yoshihiro Tatsumi, Aichi-ken (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/963,657

(22) Filed: Sep. 27, 2001

(65) Prior Publication Data

US 2002/0036123 A1 Mar. 28, 2002

(30) Foreign Application Priority Data

Sep. 28, 2000 (JP) ........................................ 2000-297651

(51) Int. Cl.[7] .............................................. F16D 51/00
(52) U.S. Cl. .................................................... 188/79.52
(58) Field of Search ........................... 188/79.51, 79.52, 188/79.55, 79.61, 196 BA, 196 D

(56) References Cited

U.S. PATENT DOCUMENTS

| | | | | | |
|---|---|---|---|---|---|
| 4,390,086 | A | * | 6/1983 | Conrad ..................... | 188/79.52 |
| 4,706,784 | A | * | 11/1987 | Shellhause ............... | 188/79.52 |
| 4,728,457 | A | * | 3/1988 | Cousin et al. ........... | 188/79.52 |
| 4,809,826 | A | * | 3/1989 | Charbonnier ............ | 188/79.52 |
| 5,758,750 | A | * | 6/1998 | Le Moigne et al. ..... | 188/79.64 |
| 6,196,360 | B1 | * | 3/2001 | Lizuka et al. ............ | 188/79.52 |

* cited by examiner

Primary Examiner—Christopher P. Schwartz
(74) Attorney, Agent, or Firm—Liniak, Berenato & White

(57) ABSTRACT

A shoe clearance over-adjustment prevention apparatus employable to various types of automatic shoe clearance adjustment devices and drum brakes and designable to have a common thermo-sensitive member suitable for mass production. The thermo-sensitive member 60 is sandwiched between the strut 20 and the brake lever 30 to cause a functional engagement, and if the brake temperature reaches a predetermined value or range, the strut 20 is pushed toward the brake shoe 12 so as to disable the automatic shoe clearance adjustment operation.

6 Claims, 10 Drawing Sheets

DRUM BRAKE DEVICE HAVING A SHOE CLEARANCE OVER-ADJUSTMENT PREVENTION APPARATUS

BACKGROUND OF THE INVENTION

1. Field of the Invention

This invention relates to a shoe clearance over-adjustment prevention apparatus for a drum brake which ceases automatic adjustment of a shoe clearance between brake shoes and a brake drum (hereinafter "shoe-to-drum clearance") when a brake temperature exceeds a predetermined value or range.

2. Description of the Related Arts

Generally, a drum brake has an automatic shoe clearance adjustment device maintaining a constant shoe-to-drum clearance depending on the amount of lining wear on the brake shoe.

If the drum brake is repeatedly applied in a case for example on a long slope, a brake drum temperature increases and the material expands to create an apparent shoe-to-drum clearance expansion, i.e., temporary expansion of the shoe-to-drum clearance to the extent of brake drum expansion.

Even if the apparent shoe-to-drum clearance expansion progresses, an action of the automatic shoe clearance adjustment device is continued. Therefore, when a brake drum diameter becomes smaller due to the temperature fall, the automatic shoe clearance adjustment device causes a problem of dragging because of an overly diminished shoe-to-drum clearance.

If a shoe-to-drum clearance in a normal use (in a use under a normal temperature) is preset to be larger for the purpose of avoiding the above-mentioned dragging, the shoe clearance over-adjustment may be prevented and on the other hand a stroking, such as a brake pedal stroke and a brake lever stroke, becomes longer causing delay in a brake effect and a disconcerting brake feeling.

As a preventive technology against the above problems, for example, the Japanese Patent Publication No. 58-49739 discloses a shoe clearance over-adjustment prevention apparatus.

The shoe clearance over-adjustment prevention apparatus as disclosed in the prior art is explained with reference to a plan view of a leading trailing (LT) type drum brake having a parking brake mechanism and an incremental type automatic shoe clearance adjustment device as shown in FIG. 9.

A strut 21, a part of which composes a screw mechanism, is extended between a left brake shoe 11 and a brake lever 30 pivotally supported on a right brake shoe 12 and is disposed adjacent to a wheel cylinder 40 for a service brake, which moves a pair of brake shoes 11, 12 to separate upper adjacent ends of the brake shoes 11, 12 apart from each other, thereby restricting a returning (initial) position of the pair of brake shoes 11, 12 with an abutment point with an anchor 15 as the fulcrum.

The strut 21 comprises a bolt 22 and a socket 23, both axially slidably fitting each other, and automatically adjust the shoe-to-drum clearance by moving to follow the right brake shoe 12 by an adjustment lever 50 receiving a force of an adjustment spring 19 in response to the over-movement of the pair of brake shoes 11, 12 during the operation of the wheel cylinder 40 and rotating a nut 24 screwing on the bolt 22 to project the bolt 22 fitting in the socket 23 to extend an overall length of the strut 21.

The conventional shoe clearance over-adjustment prevention apparatus includes a bimetal element 13, a superposed section thereof being sandwiched between the socket 23 and the nut 24, and the bolt 22 penetrating the superposed section as shown in an enlarged view of FIG. 10(A). The shoe clearance over-adjustment prevention apparatus is structured to prevent over-adjustment by ceasing an automatic shoe clearance adjustment by opening the superposed section of the bimetal element 13 against the force of the adjustment spring 19, as shown in FIG. 10(B), when the brake temperature reaches to a predetermined value or range.

The above-described conventional automatic shoe clearance over-adjustment prevention apparatus has the following drawbacks:

A use of the conventional type of shoe clearance over-adjustment prevention apparatus, in which the bimetal element is sandwiched to be installed between the nut 22 and the socket 23 both of which may axially move apart from each other, is limited to its application only in an automatic shoe clearance adjustment device for an incremental type and therefore is not extended to be applied to a one shot type, which provides a poor applicability.

A width of an engagement groove of the strut 21 at the left side in an axial direction in FIG. 9 relative to an engagement section of the left brake shoe 11 and a width of an engagement groove of the strut 21 at the right side relative to an engagement section of the brake lever 30, are narrow. Therefore, a play in a rotational direction relative to an axis of the strut 21 is created.

The strut 21 rotates corresponding to the play without the shoe clearance adjustment during the automatic shoe clearance adjustment, which degrades the automatic shoe clearance adjustment function requiring a fine tuning.

SUMMARY OF THE INVENTION

This invention was made to remove the aforementioned drawbacks, and an object of this invention is to provide an automatic shoe clearance over-adjustment prevention apparatus being applicable not only to a drum brake with an incremental type automatic shoe clearance adjustment device but also to a drum brake with the one shot type automatic shoe clearance adjustment device, thereby increasing the applicability and enabling to utilize common thermo-sensitive members.

Another object of this invention is to provide a shoe clearance over-adjustment prevention apparatus which lessens the effect of play and maintains a stable shoe-to-drum clearance.

A first aspect of this invention is a drum brake device with an automatic shoe clearance adjustment device, in which, the automatic shoe clearance adjustment device extends between a pair of adjacent ends of facing brake shoes comprising: a strut for restricting return positions of said brake shoes, the strut follows one of the brake shoes in response to an over-movement of the brake shoes and extends automatically an effective length thereof with one part of the strut being away from one of the brake shoes, wherein a shoe clearance over-adjustment prevention apparatus comprises a thermo-sensitive member. The thermo-sensitive member functionally engages with the strut so as to pressurize the same toward the other brake shoe side upon reaching a brake temperature to a predetermined value or range.

A second aspect of this invention is a shoe clearance over-adjustment prevention apparatus for a drum brake as above in which the thermo-sensitive member is a plate member, having superposed sections thereof formed by folding, sandwiched between the strut and the brake shoe.

A third aspect of this invention is a shoe clearance over-adjustment prevention apparatus for a drum brake as above in which the thermo-sensitive member is a plate member, having superposed sections formed by folding, sandwiched between the strut and a brake lever capable of moving the brake shoe.

A fourth aspect of this invention is a shoe clearance over-adjustment prevention apparatus for a drum brake as above in which the thermo-sensitive member has a rotation regulator regulating a play of the strut in the rotational direction relative to the longitudinal direction of the strut.

BRIEF DESCRIPTION OF THE DRAWINGS

The above and other objects and the attendant advantages of the present invention will readily become apparent with reference to the following detailed description when considered in conjunction with the accompanying drawings, wherein.

DETAILED DESCRIPTION OF THE PREFERRED EMBODIMENTS

The invention is configured such that the strut is pushed by the thermo-sensitive member in the direction to cease the automatic shoe clearance adjustment when the brake temperature reaches the predetermined value or range, thereby preventing the over-adjustment of the shoe clearance and maintaining a short brake stroke under the normal temperature. As such, this invention is applicable to one shot type automatic shoe clearance adjustment device as well as incremental type automatic shoe clearance adjustment device, thereby enhancing the applicability and enabling to utilize common thermo-sensitive members.

The present invention is configured such that the superposed sections of the plate thermo-sensitive member is sandwiched between the strut and the brake shoe or the strut and the brake lever, offering a larger space around a brake center and facilitating the layout.

The invention is configured such that a means to regulate the play in the rotational direction relative to the longitudinal direction of the strut, thereby maintaining an appropriate condition of the strut and stabilizing the automatic shoe clearance adjustment which requires the fine tuning.

Further, designing the thermo-sensitive member to be made of one plate integrally formed into superposed sections ceasing the automatic shoe clearance adjustment action and a rotation restrictor restricting the rotation of the strut in the longitudinal direction allows a press working on one plate, which facilitates the structure and reduces the manufacturing cost.

Examples of this invention are explained below with reference to the accompanied drawings.

Example 1 of this invention relating to the shoe clearance over-adjustment prevention apparatus is explained next with reference to FIGS. 1–4.

For the purpose of explanation, the same reference numbers as in the aforementioned conventional art will be assigned to identical parts or sites having the same functions as described in the following examples.

Figure 1A:
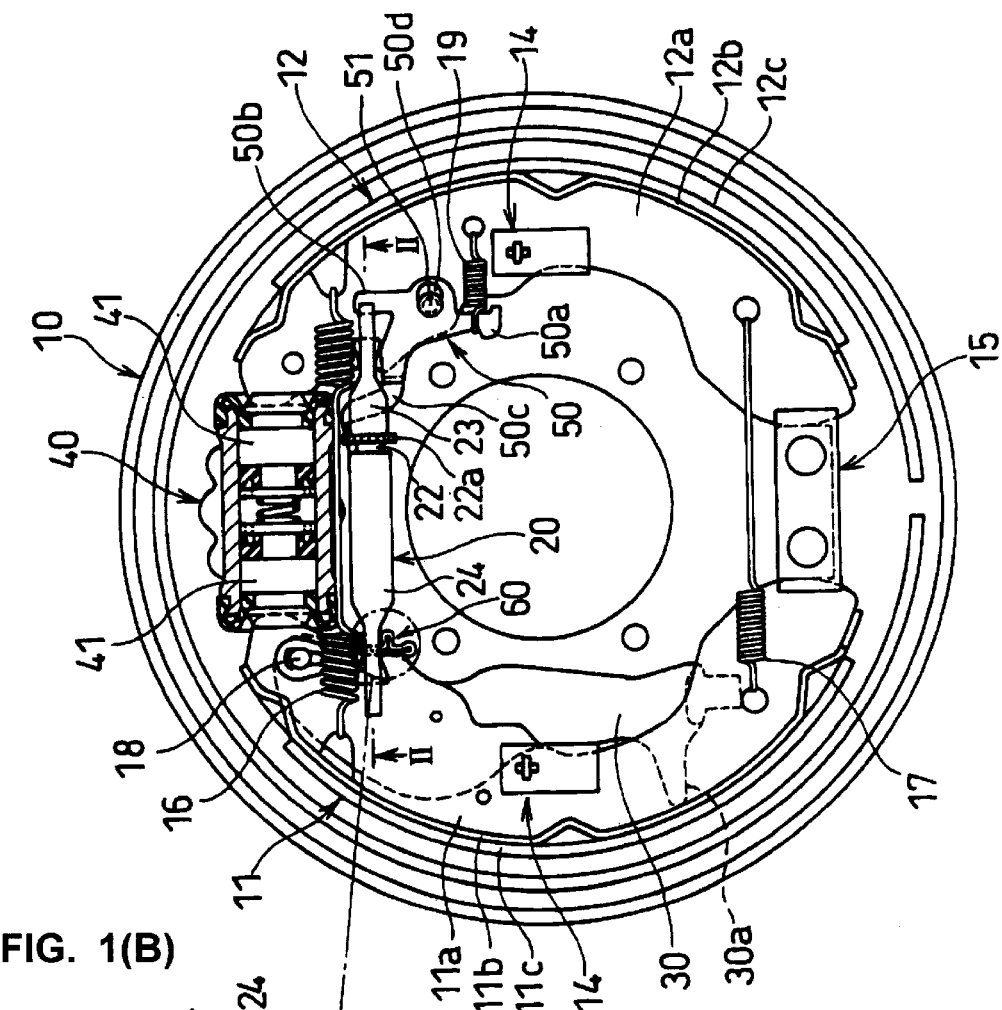
FIGS. 1(A) and 1(B) are plan views of the drum brake with the incremental type automatic shoe clearance adjustment device relating to Example 1.
Figure 1B:
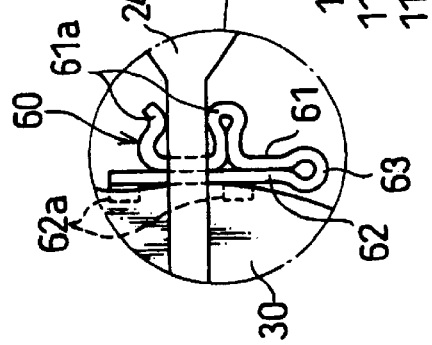

FIG. 1 shows a leading trailing (LT) type drum brake device having a parking brake mechanism and an incremental type automatic shoe clearance adjustment device.

A back plate 10 is fixed on a stationary part of a vehicle by fixing members such as bolts, and a pair of brake shoes 11, 12 are slidably supported on the back plate 10 by publicly known shoe hold devices 14, 14.

The pair of brake shoes 11, 12 formed in T-shape when viewed cross-sectionally are configured by connecting shoe rims 11b, 12b with shoe webs 11a, 12a and fixing linings 11c, 12c thereon.

Each brake shoes 11, 12 has one end (i.e., upper end in FIG. 1) engaging with one of pistons 41, 41 of a wheel cylinder 40 functioning as a shoe expander for service brake and the other end (i.e., lower end in FIG. 1) being supported by an anchor 15 fixed on the back plate 10. The wheel cylinder 40 fixed on the back plate 10 by the fixing members such as bolts has pistons 41, 41 structured to move in a stroking direction together with one end of one of brake shoes 11, 12.

Shoe return springs 16, 17 are extended between the shoe webs 11a, 12a of the brake shoes 11, 12, and the strut 20 is extended adjacent to the wheel cylinder 40 between the brake shoes 11, 12.

A brake lever 30 for a parking brake is superposed under the shoe web 11a of one brake shoe 11, and a base end of the brake lever 30 is rotatably supported at the upper end portion of the shoe web 11a by a pin 18. A brake cable (not shown in the figures) is connected with a free end (i.e., lower end in FIG. 1) of the brake lever 30 for the purpose of remotely controlling the brake lever.

An automatic shoe clearance adjustment device comprises a strut 20 restricting returning (initial) positions of the pair of brake shoes 11, 12, an adjustment lever 50, and an adjustment spring 19.

The strut 20 is a screw-engagement unit comprising a bolt 22, a socket 23, and a nut 24 and is extended between the other brake shoe 12 and the brake lever 30.

The brake lever 30 while not braking abuts its stopper 30a against an inner surface of the shoe rim 11b. Accordingly, the brake lever 30 while service braking moves together with one brake shoe 11, and the strut 20 functions as if extended between the pair of brake shoes 11, 12.

Figure 2:
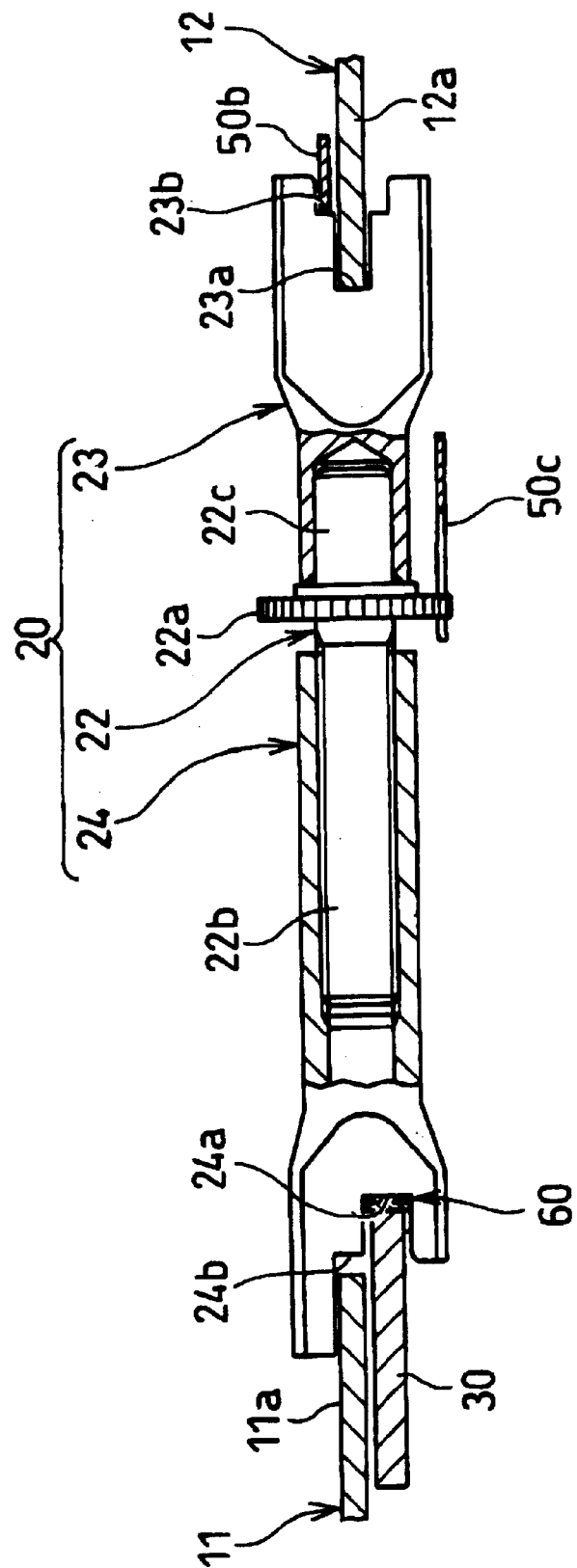
FIG. 2 is a cross-section of FIG. 1(A) taken along the line II—II.
Figure 3:
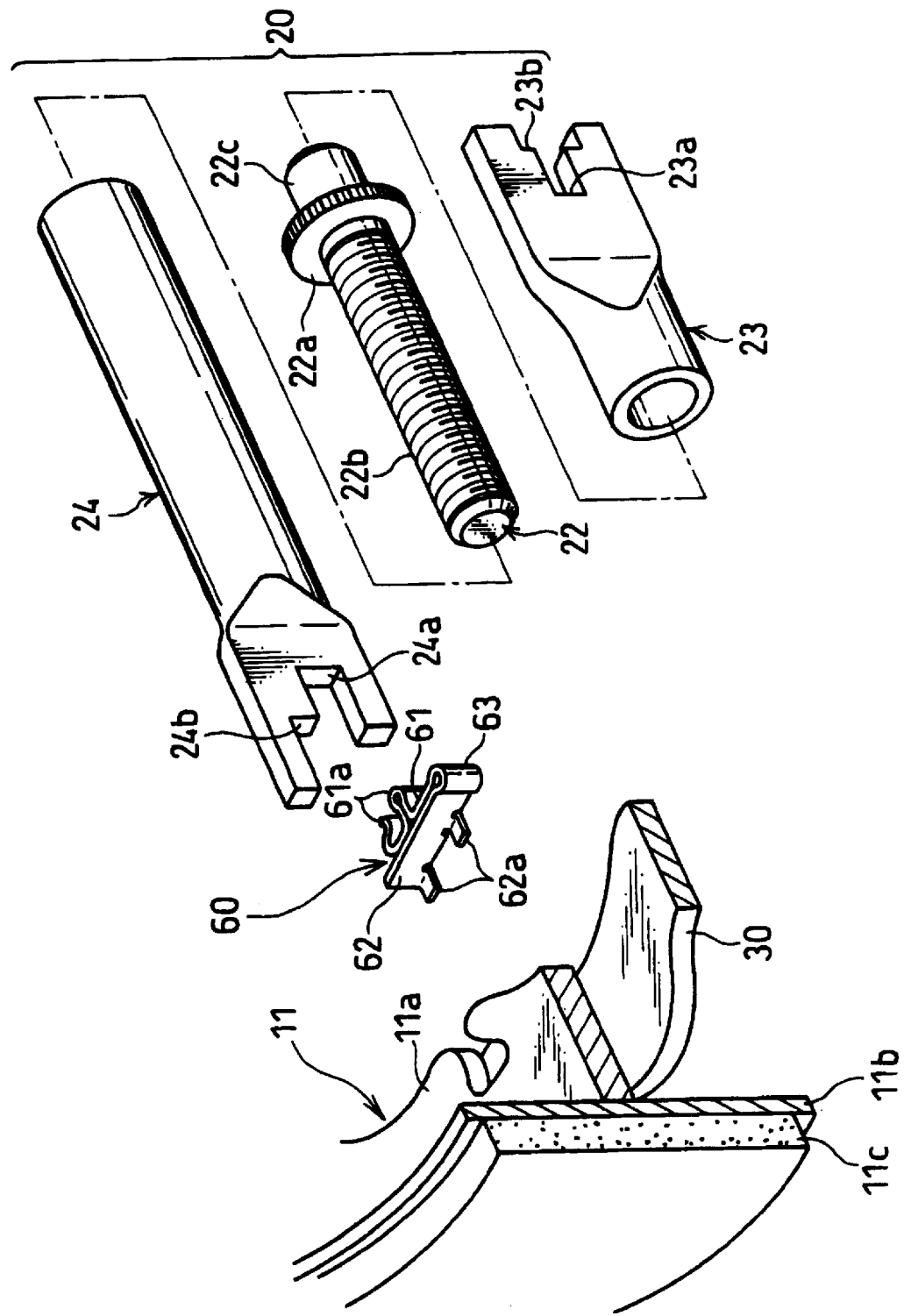
FIG. 3 is an exploded isometric view of the thermo-sensitive member.

The structure of the strut 20 is explained with reference to FIG. 2. At an intermediate portion of the bolt 22, there is an integrally formed adjustment toothed ring 22a with small teeth around its peripheral surface.

A male screw on the bolt 22 is formed at a stem 22b on the left side of the bolt 22, which is screwed and fit with the nut 24.

The stem 22c on the right side of the bolt 22 slidably rotatably fits in a cavity of the socket 23.

A notched groove 24a and a stepped portion 24b connecting with the notched groove 24a are formed at a left end of the nut 24. A bottom surface of the notched groove 24a engages with and supports the brake lever 30 via a thermo-sensitive member 60, and the stepped portion 24b extends over and non-rotatably engages with the shoe web 11a of the brake shoe 11.

A notched groove 23a and a stepped portion 23b connecting with the notched groove 23a are formed at a right end of the socket 23. A bottom surface of the notched groove 23a supports and non-rotatably engages with the shoe web 12a of the brake shoe 12.

Rotating the bolt 22 via the adjustment toothed ring 22a, the bolt is capable of moving forward or backward relative to the nut 24, and the overall length of the strut becomes adjustable, thereby enabling to restrict the returning position of the pair of brake shoes 11, 12.

The adjustment lever 50 is composed of a plate integrating a first branch 50a, a second branch 50b, and a third branch 50c. The adjustment lever 50 is rotatably supported at a small diameter side of a bell-shape oblong hole 50d formed on the intermediate portion thereof with a pin 51 fixed on the shoe web 12.

The first branch 50a is extended downward in FIG. 1 from a pivot section of the adjustment lever 50, and a spring force of the adjustment spring 19 stretched between the first branch 50a and the shoe web 12a is constantly applied to the adjustment lever 50 as a counterclockwise rotational force with the pin 51 as the fulcrum.

The second branch 50b is extended toward the right end of the socket 23 from the pivot section of the adjustment lever 50, and the inner edge of the second branch 50b is forced to contact the stepped surface of the stepped portion 23b formed on the right side of the socket 23.

The third branch 50c is extended from the pivot section of the adjustment lever 50 toward the nut 24, and its tip engages with the adjustment toothed ring 22a to permit rotation in one direction.

The spring force of the adjustment spring 19 is constantly applied in the direction to abut the third branch 50c with the adjustment toothed ring 22a.

The pivot structure of the adjustment lever 50 is not limited to what is described in the figures herein, in which the pin may be provided at the adjustment lever 50 while the oblong hole may be formed on the shoe web 12a. For example, the oblong hole 50d may be a circular hole. The adjustment lever 50 is rotatably supported relative to the shoe web 12a.

In the following section, the shoe clearance over-adjustment prevention apparatus, in which automatic shoe clearance adjustment is ceased when the brake temperature reaches the predetermined value or range, will be described.

This type of shoe clearance over-adjustment prevention apparatus is configured by the thermo-sensitive member 60.

Figure 4A:
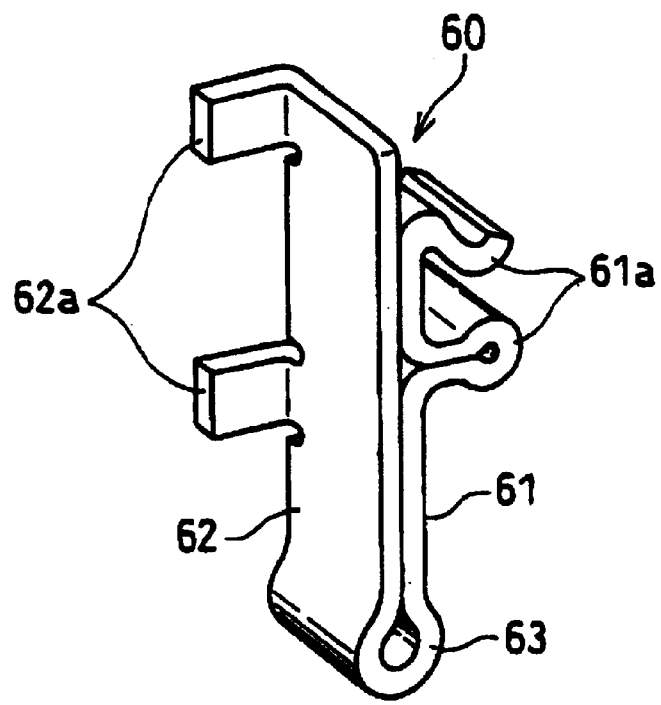
FIG. 4(A) is an isometric view of the thermo-sensitive member prior to the deformation and FIG. 4(B) is an isometric view of the thermo-sensitive member after deforming.

As shown in FIG. 4(A), the thermo-sensitive member 60 made of a plate has a folded and superposed structure composed of a first leg 61 and a second leg 62.

Figure 4B:
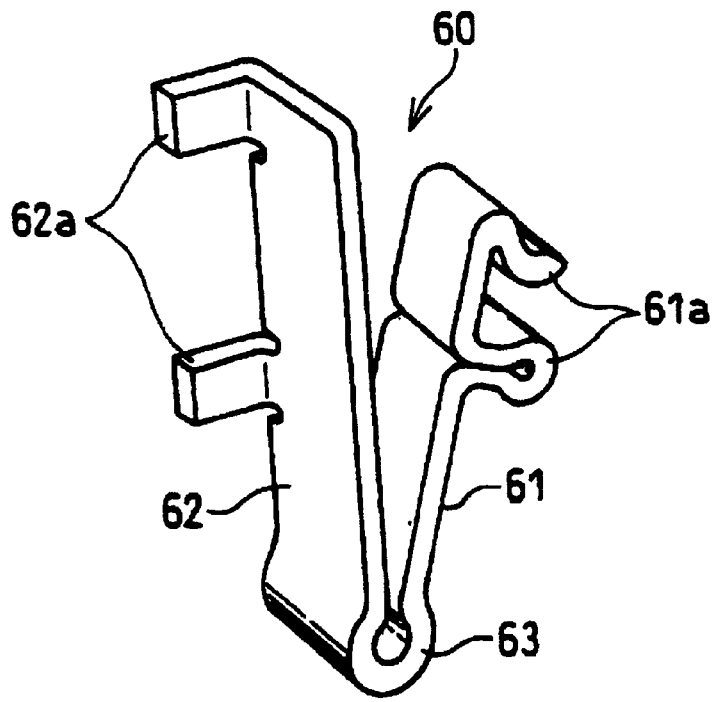

The thermo-sensitive member 60 is designed so that until the brake temperature reaches the predetermined value or range or until an atmosphere temperature around the thermo-sensitive member 60 reaches the predetermined value or range, the first leg 61 and the second leg 62 maintain their superposition as shown in FIG. 4(A), and both legs 61, 62 are deformed to move apart from each other from the folded section 63 once the brake temperature reaches the predetermined value or range as shown in FIG. 4(B).

In order to deform to spread both legs 61, 62 apart, an entire piece including both legs 61, 62 may be made of a bimetal or a shape memory alloy. Alternatively, at least the folded section 63 and half areas of both legs 61, 62 connected therewith may be made of a bimetal or a shape memory alloy and the other half areas of legs 61, 62 made of non-thermo-sensitive materials may be integrated such as by rivet.

An approximately C-shaped clip 61a is formed at a top of the first leg 61, and the width of the bottom of the clip 61a at least and width of the second leg 62 superposed thereon are smaller than a groove width of the notched groove 24a of the nut 24 and contact each other. The superposed section is inserted to be fit with the notched groove 24a of the nut 24, and the clip 61a is elastically fit and integrated with a flat section of the nut 24.

A member to which the thermo-sensitive member 60 is attached is not limited to the strut 20 and may be attached to the brake lever 30. At least, for convenience of handling each member, it is desirable to integrate the thermo-sensitive member 60. Further, the thermo-sensitive member 60 is to be non-rotatable in order to avoid interfering with other members such as the shoe return spring 16.

A single or plural stoppers 62a extend in a right angle relative to the flat surface of the second leg 62 and are located at one side of the second leg 62 positioning the flat section of the nut 24 therebetween.

The stopper 62a slightly contacts a plate surface of the brake lever 30 or faces the same with a slight gap, thereby keeping a small play in the rotational direction relative to axis of the nut 24 and function as a rotation regulating member to restrict the movement of the strut 20 when in shoe clearance adjustment operation. Therefore, a shoe clearance adjustment is stabilized.

The drum brake operation is explained next.

In FIG. 1, when the wheel cylinder 40 is pressurized for operating the service brake, the pair of brake shoes 11, 12 move outward with points of abutment with the anchor 15 and frictionally engage with the brake drum (not shown in figures).

While the adjustment lever 50 rotates counterclockwise, by the spring force of the adjustment spring 19, with the pin 51 as the fulcrum, the strut 20 and the brake lever 30 follow the movement of the brake shoe 11.

When the brake cable (not shown in the figures) is pulled, the brake lever 30 rotates counterclockwise with the pin 18 as the fulcrum to push the strut 20 toward right in the figure, and the brake shoe 12 moves outward with the point of abutment with the anchor 15 to frictionally engage with the brake drum. Accordingly, the adjustment lever 50 moves simultaneously with the brake shoe 12.

The brake lever 30 rotates with the point of abutment with the thermo-sensitive member 60 installed on the strut 20 and pushes the brake shoe 11 toward left in the figure via the pin 18 to move the brake shoe 11 outward with the abutment point with the anchor 15 to frictionally engage with the brake drum.

When the service brake is operated, when linings 11c, 12c are worn off and when the brake temperature does not reach the predetermined value or range, both legs 61, 62 of the thermo-sensitive member 60 maintain their tight contact as shown in FIG. 4(A). Therefore, the amount of brake shoe movement regarding both brake shoes 11, 12 increases, and if the amount of rotation of the third branch 50c of the adjustment lever 50 exceeds a tooth pitch of the adjustment toothed ring 22a, the adjustment lever 50 rotates the adjustment toothed ring 22a and screws the bolt 22 out from the nut 24. As a result, overall length of the strut 20 extends to the amount equivalent to one tooth pitch of the adjustment toothed ring 22a, and the shoe-to-drum clearance is automatically adjusted to maintain a constant clearance.

When in parking brake operation, in FIG. 1, the strut 20 is pressed to simultaneously move the brake shoe 12 toward right. At the same time, the adjustment lever 50 also moves together, and no automatic shoe clearance adjustment is conducted.

When in automatic shoe clearance adjustment operation, if the brake temperature reaches the predetermined value or range, the thermo-sensitive member 60 is deformed against the force of the adjustment spring 19 into an almost V-shaped configuration (FIG. 4(B), thereby preventing the rotation of the adjustment lever 50 and ceasing the automatic shoe clearance adjustment operation. Therefore, the amount of heat expansion of the brake drum until the brake temperature goes down below the predetermined value or range is not absorbed, which ultimately prevents the shoe clearance over-adjustment.

Installing the thermo-sensitive member 60 as the shoe clearance over-adjustment prevention apparatus on the end of the strut 20 makes it possible not only to set small shoe to-drum clearance but also to avoid undesirable brake design such as designing a larger brake diameter, using wider linings 11c, 12c for the purpose of moderating the temperature increase. Further, it is possible to have a wider space at the intermediate section of the brake, thereby facilitating the use of smaller diameter drum brake.

Example 2 of this invention is explained with reference to a drum brake shown in FIGS. 5 and 6.

For the purpose of explanation, except for structural components of the automatic shoe clearance adjustment device, the same reference numbers as in Example 1 will be assigned to identical parts or sites having the same functions as described in Example 2 and the explanation of which is omitted here.

For example, Example 2 illustrates an automatic shoe clearance over-adjustment prevention apparatus for a one shot type automatic shoe clearance adjustment device having the same fundamental structure in the Japanese Patent Publication No. 57-43771.

The strut 70 comprises a strut body 71, and a bell crank lever 72. In addition to these components, an adjustment spring 73 is added to compose the automatic shoe clearance adjustment device.

The brake lever 30 for a parking brake is superposed under the shoe web 12a of the brake shoe 12, and the end of the brake lever 30 pivotally supported at the upper end of the shoe web 12a by pin 18 while the brake cable (not shown in the figures) is connected to the lower end of the brake lever 30. The strut body 71 adjacent to the wheel cylinder 40 is designed such that a notched groove 71a formed at the right side receives the brake lever 30 and the shoe web 12a, and the bottom surface of the notched groove 71a supports the brake lever 30 via the thermo-sensitive member 60. Small teeth 71b are formed on an intermediate section of the strut body 71.

The intermediate section of the bell crank lever 72 is rotatable at the left end section 71c of the strut body 71 and is pivotally supported by the pin 75 while being movable along longitudinal direction of the strut body 71. The small teeth 72b formed on the peripheral surface of a fan-shaped arm 72a at one side of the bell crank lever 72 engage with the small teeth 71b on the strut body 71. A rectangular hole 11d is formed on the shoe web 11a of the brake shoe 11, and the other arm 72c with a cam surface freely fits in the rectangular hole 11d with a predetermined gap $\delta_1$ at a brake center side.

The adjustment spring 73 is extended between the shoe web 12a and the strut body 71, and a bell crank spring 74 is extended between the strut body 71 and the pin 75. Mounting load of the adjustment spring 73 is to be designed larger than that of the bell crank spring 74.

The thermo-sensitive member 60 as the shoe clearance over-adjustment prevention apparatus is symmetrical relative to the one in the above-described Example 1, and any corresponding members will be explained with the identical reference numbers.

The thermo-sensitive member 60 has its clip 61 a resiliently contacting the strut body 71, and the superposed sections are inserted between the strut body 71 and the brake lever 30.

When the service brake is operated to move both brake shoes 11, 12 outward, the strut body 71 follows the brake shoe 12 because of the spring force of the adjustment spring 73.

If the linings 11c, 12c wear out and the amount of outward movement of the pair of brake shoes 11, 12 exceeds the amount of the gap $\delta_1$ between the other arm 72c of the bell crank lever 72 and the rectangular hole 11d plus the height of the small teeth 72b, the bell crank lever 72 rotates to move, for one tooth pitch, the abutment point of the cam surface of the other arm 72c abutting against the rectangular hole 11d of the shoe web 11a. Also, a distance between the inner surface of the rectangular hole 11d supporting the other arm 72c and the bottom of the strut body 71 supporting the inner edge of the brake lever 30 is extended. In another word, the actual effective length of the strut 70 is extended to make the shoe-to-drum clearance smaller, thereby maintaining an almost constant shoe-to-drum clearance.

Figure 5B:
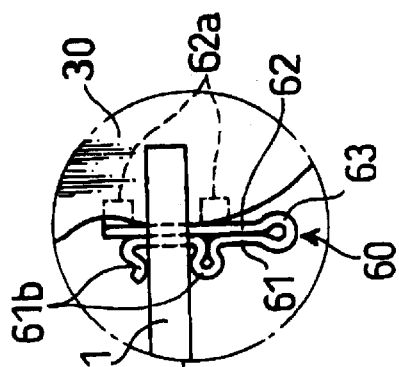
FIGS. 5(A) and 5(B) are plan views of the drum brake with one shot type automatic shoe clearance adjustment device relating to Example 2.
Figure 5A:
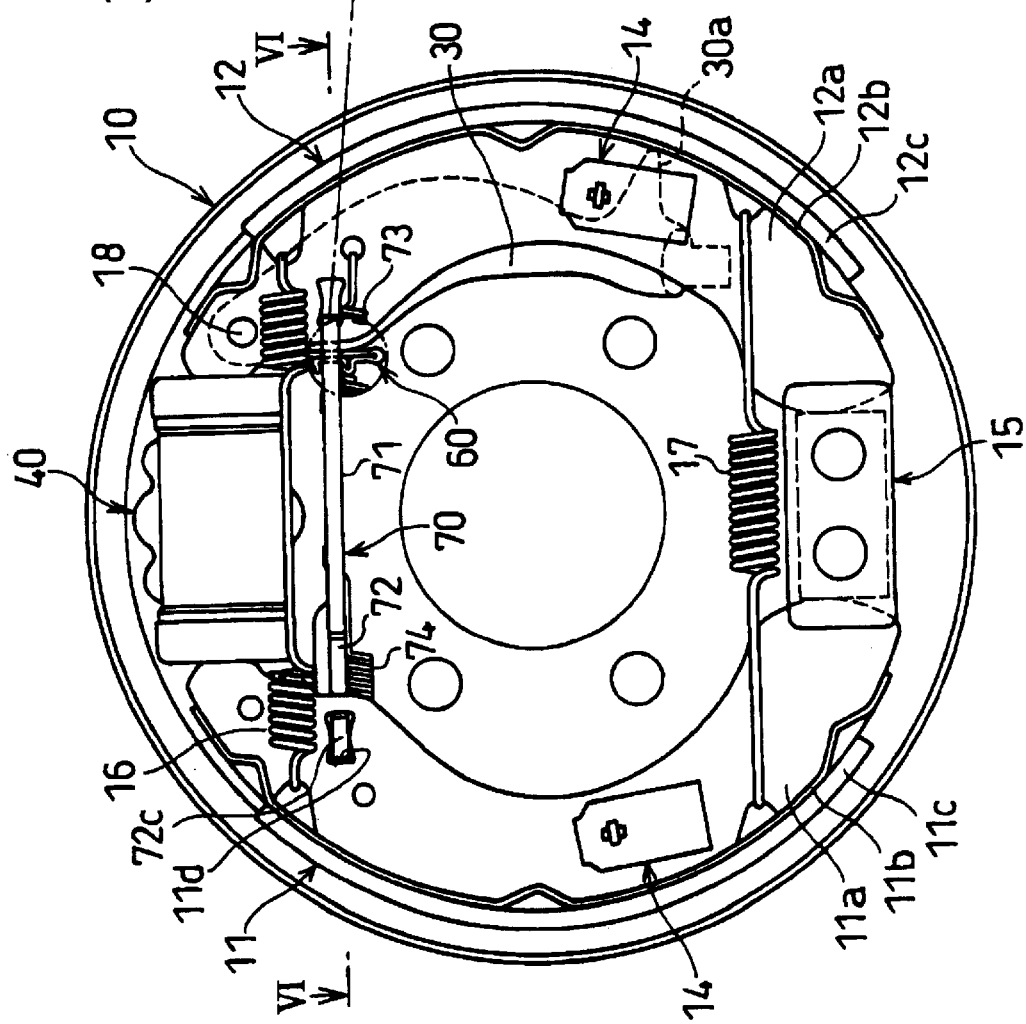
Figure 6:
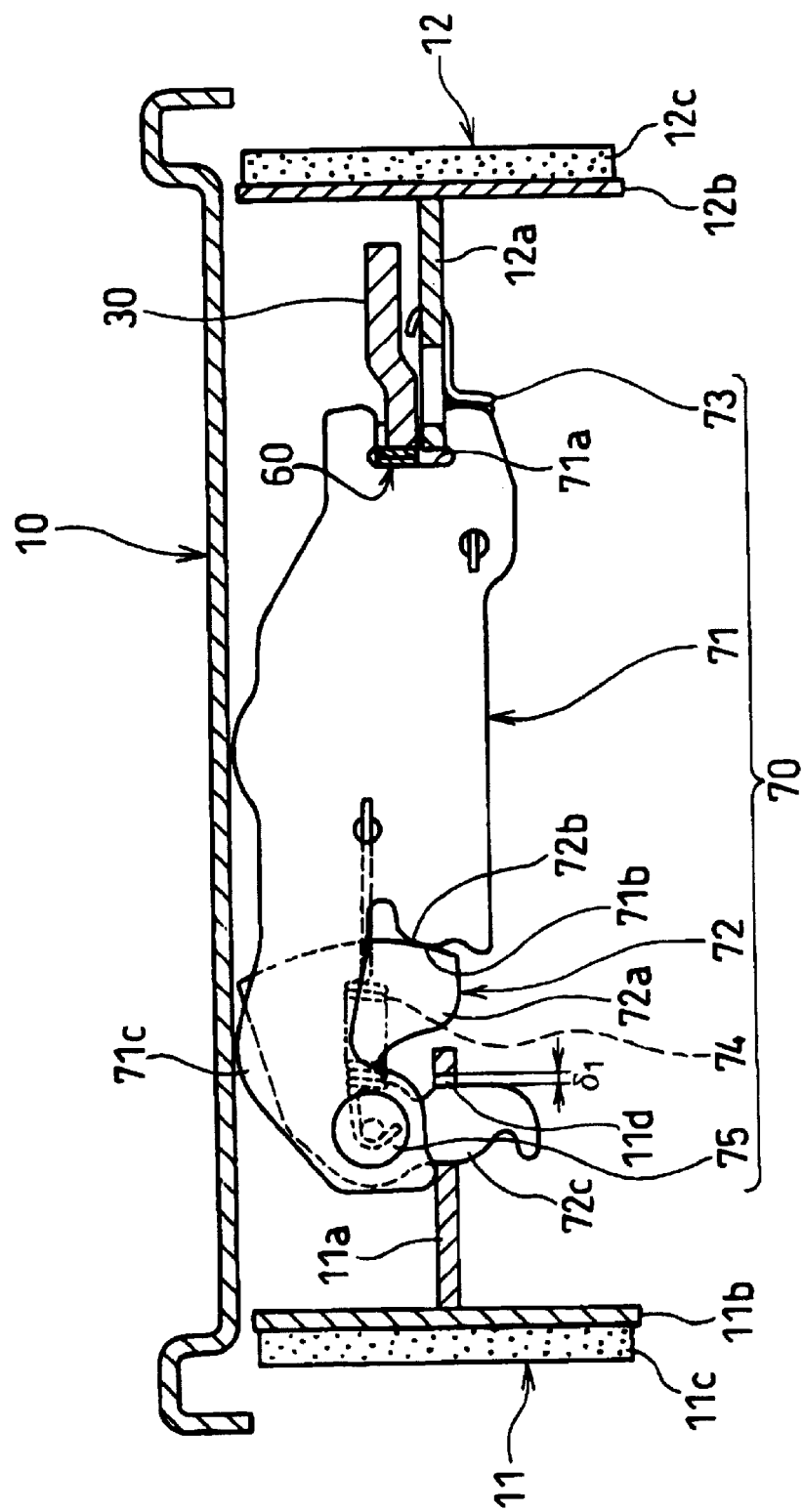
FIG. 6 is a cross-section of FIG. 5(B) taken along the line VI—VI.

When in parking brake operation, as shown in FIG. 5, the strut 70 moves to the left together with the brake shoe 11, and the brake shoe 12 moves alone to the right while stretching the adjustment spring 73. Therefore, automatic shoe clearance adjustment has no effect.

If the brake temperature reaches the predetermined value or range when conducting automatic shoe clearance adjustment operation, the thermo-sensitive member 60 deforms into an almost V-shape against the force of the adjustment spring 73 and, spacing the strut 70 from the brake lever 30, the strut body 71 and the bell crank lever 72 follow the movement of the brake shoe 11. Accordingly, an extending function of the automatic shoe clearance adjustment device is disabled.

The thermo-sensitive member 60 employed in this example as a shoe clearance over-adjustment prevention apparatus may be the same shape as the one explained in Example 1 for an incremental type automatic shoe clearance adjustment device.

Generally, for one shot type shoe clearance adjustment device, considering the available space in the brake, the adjustment spring 73 is positioned along a plate surface of the plate strut body 71. Accordingly, the strut 70 inclines (in a rotational direction relative to the longitudinal direction of the strut 70) due to the biasing force of the adjustment spring 73, and abutment surfaces between the bell crank lever 72 and the rectangular hole 11*d* and abutment surfaces between the strut body 71 and the thermo-sensitive member 60 slightly vary, which causes an instability of the shoe-to-drum clearance.

As in Example 2, if the stopper 62*a* of the thermo-sensitive member 60 abuts against the plate surface of the brake lever 30, and the strut 70 is aligned in a correct position, the above-abutment surfaces become always constant, which stabilizes the shoe-to-drum clearance that needs fine tuning.

Example 3 is explained with reference to FIGS. 7 and 8.

For example, Example 3 illustrates an automatic shoe clearance over-adjustment prevention apparatus for a one shot type automatic shoe clearance adjustment device having the same fundamental structure in the Japanese Patent Publication No. 43-21822.

The strut 80 comprises a strut body 81, an adjustment lever 83, and a pawl 85. In addition to these components, an adjustment spring 82 is added to compose the automatic shoe clearance adjustment device.

The brake lever 30 for a parking brake is superposed under the shoe web 12*a* of the brake shoe 12, and the end of the brake lever 30 is pivotally supported adjacent to an upper end side of the shoe web 12*a* by a pin 18 with capacity of making a relative rotation while a brake cable (not shown in the drawings) is connected to the lower end of the brake lever 30.

The adjustment lever 83 is superposed under the shoe web 11*a* of the brake shoe 11, and the end of the adjustment lever 83 is pivotally supported adjacent to an upper end side of the shoe web 11*a* by pin 86 with capacity of making a relative rotation while a free end at the lower side is formed in an arc-shape and the peripheral surface on which has small teeth 83*a*.

Figure 7B:
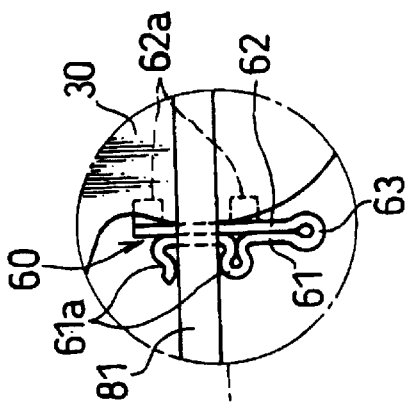
FIGS. 7(A) and 7(B) are plan views of the drum brake with another one shot type automatic shoe clearance adjustment device relating to Example 3.
Figure 7A:
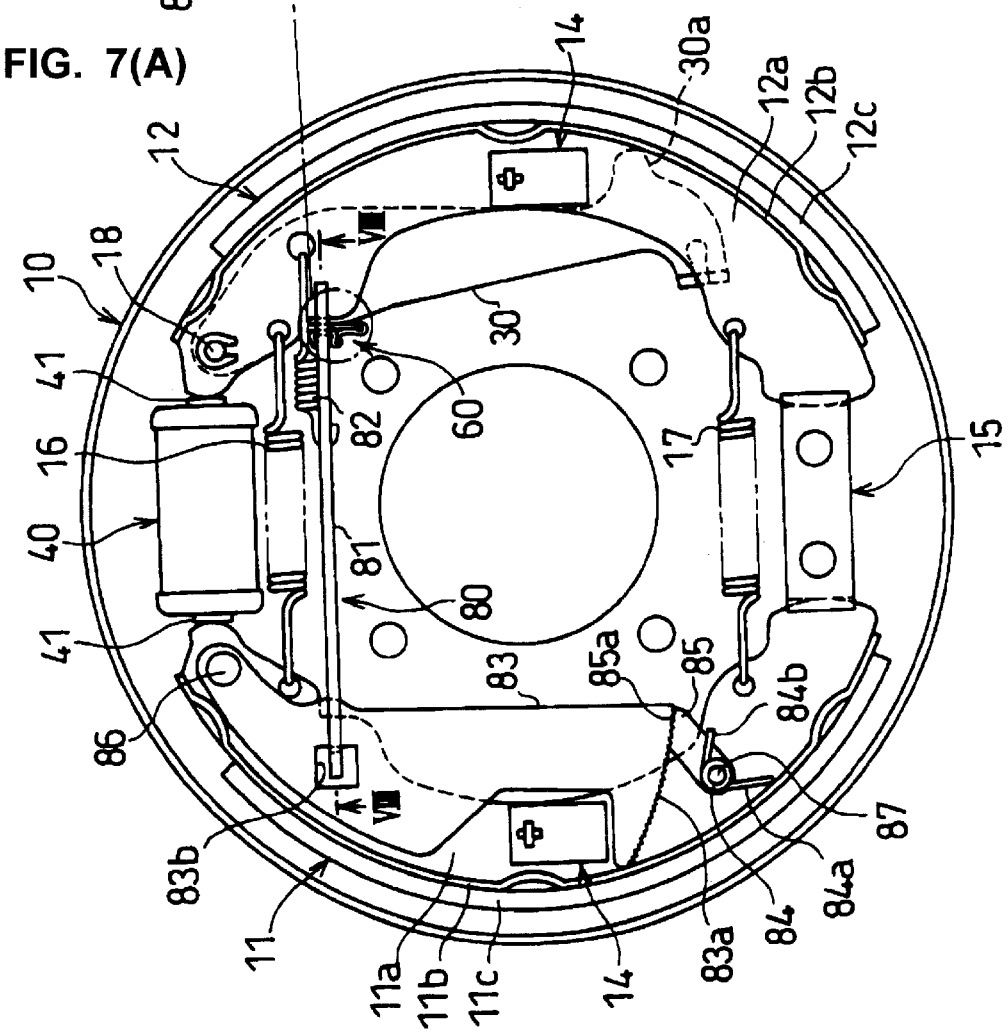
Figure 8:
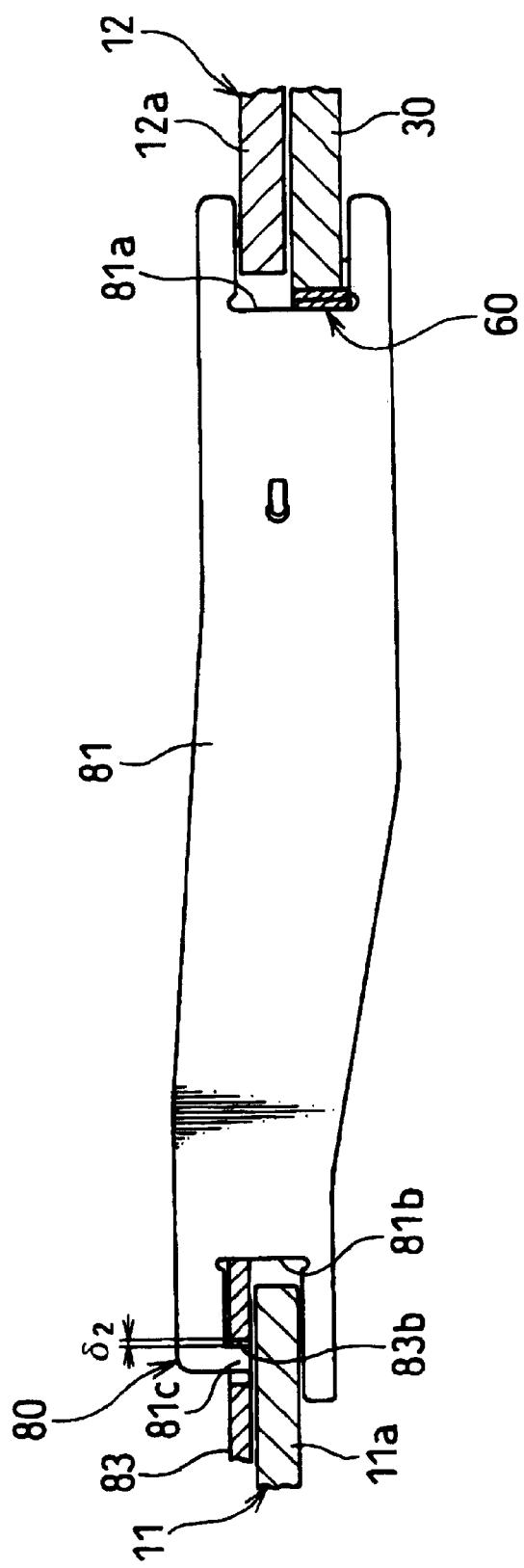
FIG. 8 is a cross-section view of FIG. 7(A) taken along the line VIII—VIII.
Figure 9:
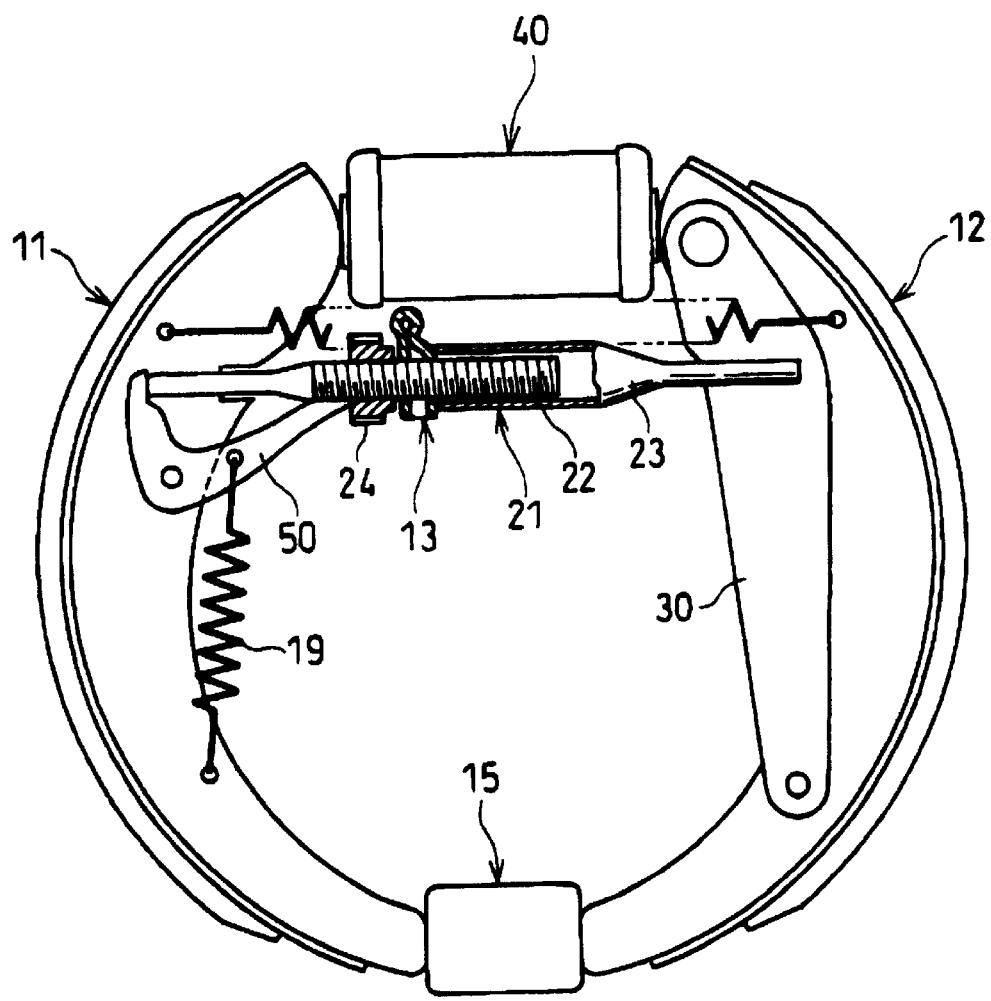
FIG. 9 is a plan view of the drum brake with the conventional incremental type automatic shoe clearance adjustment device.
Figure 10A:
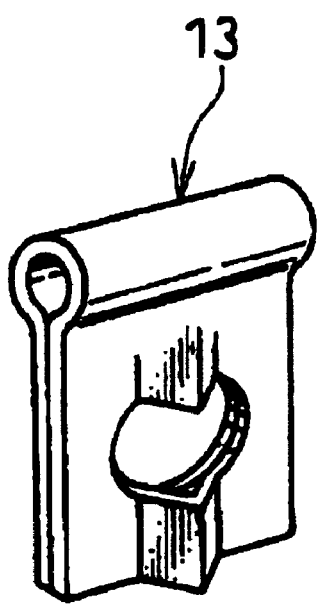
FIG. 10(A) is an isometric view of bimetal element prior to deformation and FIG. 10(B) is the bimetal element during the deformation.
Figure 10B:
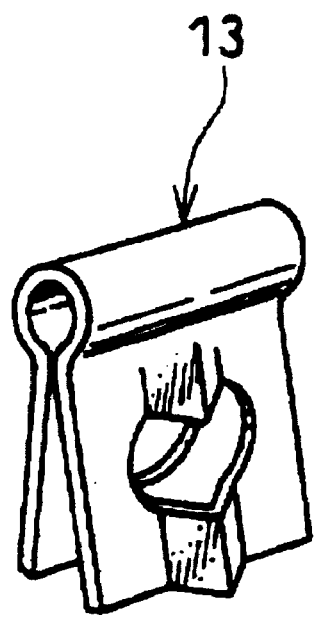

The pawl 85 has its one side pivotally supported at the lower side of the shoe web 11*a* by the pin 87 with capacity of making a relative rotation while the small teeth 85*a* formed on the peripheral surface of the other side of the pawl 85 engages with the small teeth 83*a* of the adjustment lever 83, which restricts the clockwise rotation of the adjustment lever 83 as in FIG. 7.

A torsion spring 84 has a coil section wound around the pin 87, and a wire end 84*a* at one side of the torsion spring 84 abuts against the inner surface of the shoe rim 11*b* while a wire hook 84*b* at the other side of the torsion spring 84 is hooked on the pawl 85 so as to provide a counterclockwise rotational force to the pawl 85 as in FIG. 7, which maintains the engagement between the small teeth 83*a* and 85*a* of the adjustment lever 83 and the pawl 85.

The plate strut body 81 adjacent and parallel to the wheel cylinder 40 has the notched groove 81*a* formed at the right side which receives the intermediate portion of the brake lever 30 and the shoe web 12*a*, and the bottom surface of the notched groove 81*a* supports the brake lever 30 via the thermo-sensitive member 60.

When in service brake operation by pressurizing the wheel cylinder 40, in order to move the strut body 81 together with the brake shoe 12, the adjustment spring 82 is extended between the strut body 81 and the shoe web 12*a*.

The notched groove 81*b* formed at the left side of the strut body 81 receives the shoe web 11*a* and the intermediate portion of the adjustment lever 83, and the bottom surface of the notched groove 81*b* supports the inner edge of the adjustment lever 83.

A rectangular hole 83*b* is formed on the adjustment lever 83, and a hooking 81*c* at the left end of the strut body 81 freely fits in the rectangular hole 83*b* with a predetermined gap $\delta_2$ at a brake center side while a radial side of the rectangular hole 83*b* has a gap for an absorption of the manufacturing tolerance.

The shape of the thermo-sensitive member 60 of this example is same as the one in Example 2, the structural components, and the operation are identical and the explanation of which is omitted.

If the linings 11*c*, 12*c* wear out and the service brake is operated, the strut body 81 and the brake lever 30 follow the brake shoe 12 by a spring force of the adjustment spring 82, the adjustment lever 83 and the pawl 85 move together with the brake shoe 11. Therefore, the inner edge of the hooking 81*c* of the strut body 81 abuts against the rectangular hole 83*b* of the adjustment lever 83 to fill the clearance $\delta_2$ up, and in addition, the adjustment lever 83 rotates counterclockwise in FIG. 7 against the spring force of the torsion spring 84, thereby moving the engagement positions of the teeth of the adjustment lever 83 and the pawl 85. Accordingly, the actual effective length of the strut 80 is extended to maintain an almost constant shoe-to-drum clearance.

Examples 1–3 all deal with an example of a drum brake incorporating the brake lever 30 therein for a parking brake. However, for the drum brake with a service brake only, the superposed section of the thermo-sensitive member 60 may be inserted between the shoe web and the strut.

The conventional strut 21 may be substituted for the strut 20 in Example 1, and the adjustment lever 50 in Example 1 may be positioned at the brake shoe 11 side.

Further, the shoe clearance over-adjustment prevention apparatus of this invention, for example as in the Japanese Provisional Patent Publication No. 9-273573, may be a dual mode type drum brake which functions as a leading trailing (LT) type brake during the service brake operation and functions as a duo servo (DS) type brake during the parking brake operation, which increases the applicability.

The thermo-sensitive member as the shoe clearance over-adjustment prevention apparatus is designed to be sandwiched between the strut and the brake shoe or the brake lever. The thermo-sensitive member may be employed in various types of struts.

The thermo-sensitive member is applicable to various types of drum brakes including the LT type drum brake having an incremental type or one shot type automatic shoe clearance adjustment device, a dual mode type drum brake functioning as LT type drum brake when in service brake operation and as the DS type when in parking brake operation. The thermo-sensitive member may be commonly designed which is suitable to mass production.

If a means to regulate a play in a rotational direction relative to the longitudinal direction of the strut alignment, i.e., a means to constantly maintain the strut position, is provided with the thermo-sensitive member, no movement due to the play can be seen during the automatic shoe clearance adjustment operation of one shot type and the abutment surfaces are always aligned in the right position, thereby stabilizing the shoe-to-drum clearance which needs fine tuning.

Since the thermo-sensitive member is provided to the end of the strut, a wider space may be reserved at the central region of the brake, which gives an applicability to a small diameter drum brake.

While the foregoing invention has been shown and described with reference to several preferred embodiments, it will be understood by those of skill in the art that various changes in form and design may be made therein without departing from the spirit and scope of the present invention.

What we claim is:

1. A drum brake device with an automatic shoe clearance adjustment device, said automatic shoe clearance adjustment device extended between a pair of adjacent ends of facing brake shoes comprising:

a strut for restricting return positions of said brake shoes, said strut follows first brake shoe in response to a movement of said brake shoes and extends automatically an effective length thereof with one part of said strut being away from said first brake shoe when a movement of the other brake shoe exceeds a predetermined value or range, wherein a shoe clearance over-adjustment prevention apparatus comprising a thermo-sensitive member positioned between an end of said strut and said one brake shoes, said thermo-sensitive member functionally engages with the strut so as to pressurize said strut toward the other brake shoe side upon reaching a brake temperature to a predetermined value or range.

2. A shoe clearance over-adjustment prevention apparatus for a drum brake according to claim 1, wherein the thermo-sensitive member is a plate member, having superposed sections formed by folding, sandwiched between the strut and the brake shoe.

3. A shoe clearance over-adjustment prevention apparatus for a drum brake according to claim 1, wherein the thermo-sensitive member is a plate member, having superposed sections formed by folding, sandwiched between the strut and a brake lever capable of moving the brake shoe.

4. A shoe clearance over-adjustment prevention apparatus for a drum brake according to claim 1, wherein the thermo-sensitive member has a rotation regulator regulating a play of the strut in the rotational direction relative to the longitudinal direction of the strut.

5. A shoe clearance over-adjustment prevention apparatus for a drum brake according to claim 2, wherein the thermo-sensitive member has a rotation regulator regulating a play of the strut in the rotational direction relative to the longitudinal direction of the strut.

6. A shoe clearance over-adjustment prevention apparatus for a drum brake according to claim 3, wherein the thermo-sensitive member has a rotation regulator regulating a play of the strut in the rotational direction relative to the longitudinal direction of the strut.

* * * * *